United States Patent [19]

Grandfield

[11] Patent Number: 4,811,379
[45] Date of Patent: Mar. 7, 1989

[54] SPEAK BACK PAGING SYSTEM

[75] Inventor: Walter J. Grandfield, Lake Worth, Fla.

[73] Assignee: Motorola, Inc., Schaumburg, Ill.

[21] Appl. No.: 135,856

[22] Filed: Dec. 21, 1987

[51] Int. Cl.[4] .............................................. H04Q 7/00
[52] U.S. Cl. ...................................... 379/57; 340/825.44; 379/58
[58] Field of Search ................ 379/57, 58, 56, 59, 379/60, 61, 62, 63; 370/90; 340/825.44, 825.54, 825.47, 825.48, 825.08, 311.1, 313; 455/54, 56, 13, 33

[56] References Cited

U.S. PATENT DOCUMENTS

| | | | |
|---|---|---|---|
| 3,824,560 | 7/1974 | Vitolo et al. | 340/313 |
| 3,973,200 | 8/1976 | Akerkerg | 340/825.44 |
| 3,976,995 | 8/1976 | Sebestyen | 340/337 |
| 4,197,526 | 4/1980 | Levine et al. | 340/311 |
| 4,208,638 | 6/1980 | Martinez | 375/7 |
| 4,466,001 | 8/1984 | Moore et al. | 340/825.08 |
| 4,595,921 | 6/1986 | Wang et al. | 340/825.08 |
| 4,644,347 | 2/1987 | Lucas et al. | 340/825.04 |
| 4,680,583 | 7/1987 | Grover | 340/825.52 |
| 4,706,086 | 11/1987 | Panizza | 340/902 |
| 4,747,122 | 5/1988 | Bhagat et al. | 379/57 |

FOREIGN PATENT DOCUMENTS

| | | | |
|---|---|---|---|
| 0213929 | 3/1987 | European Pat. Off. | 379/57 |
| 0098057 | 5/1986 | Japan | 379/57 |
| 0208931 | 9/1986 | Japan | 340/825.44 |

Primary Examiner—Robert Lev
Attorney, Agent, or Firm—Vincent B. Ingrassia; Anthony J. Sarli, Jr.; Donald B. Southard

[57] ABSTRACT

A paging system is provided having page transmission means responsive to a message origination device for transmitting selective call paging signals and messages. A query signal is also transmitted a predetermined minimum time period from the corresponding paging signal. A plurality of transceivers are provided responsive to the selective call paging signals and messages, and further responsive to the query signals for enabling the generating and transmitting of a response signal. Receivers are provided for receiving the transmitted response signals. The received response signals are then delivered to the message origination device from which the original message originated.

19 Claims, 7 Drawing Sheets

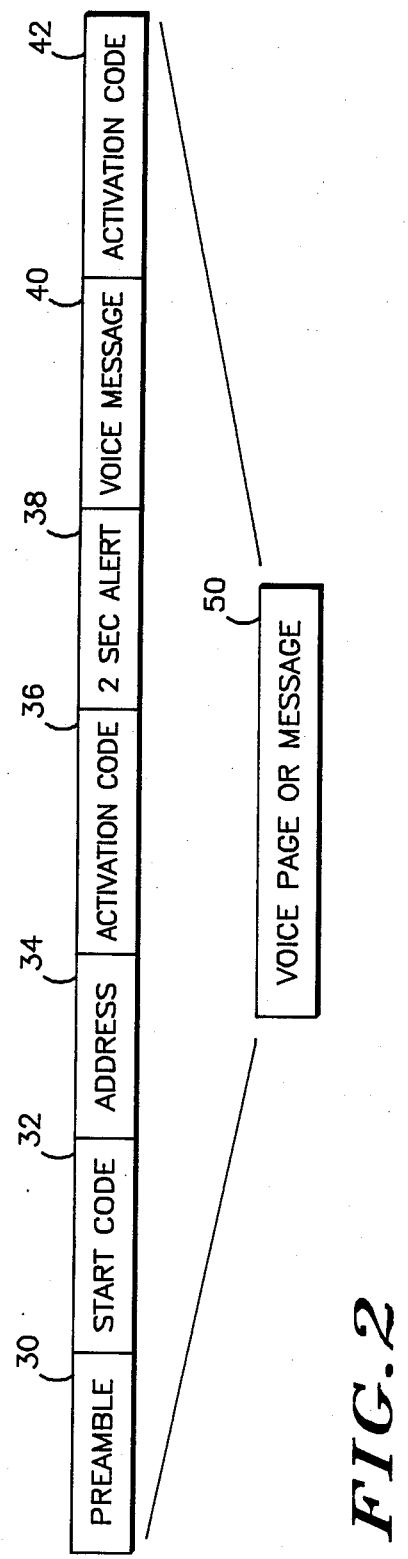
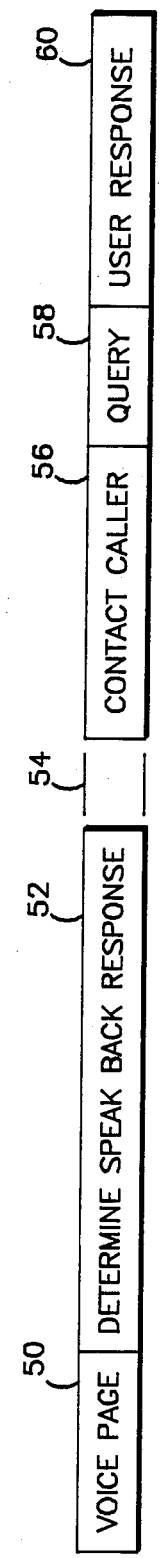
FIG. 2
FIG. 3A

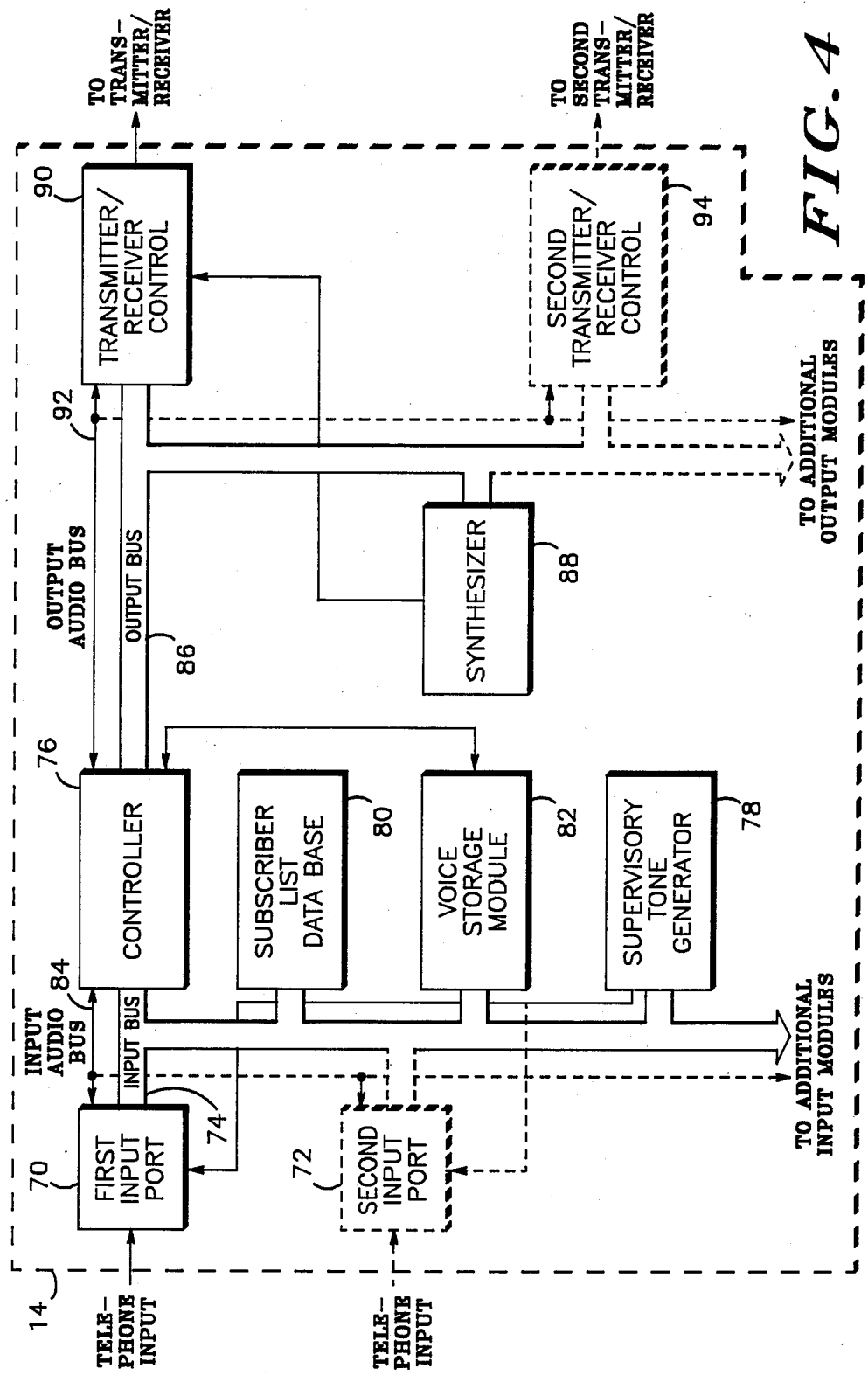

SPEAK BACK PAGING SYSTEM

FIELD OF THE INVENTION

This invention relates to paging systems, and more particularly, to paging systems providing voice acknowledgment responses.

BACKGROUND OF THE INVENTION

Paging systems have been widely used for contacting paging users who are out of their office or otherwise not immediately accessible. Various message formats have been used in these systems to convey the messages from a caller to the paging user. Of these, voice paging has been widely used because a voice message provided the most complete information to the paging user, however, at the expense of a significant amount of air time. Tone only systems solved this air time problem by only alerting the paging user at the expense of providing only limited message information, such as "call your office" or "call home". More recently, numeric paging systems have provided increased information capability by transmitting a telephone number, such as "305-123-7787", which was displayed on the pager identifying the caller, while alphanumeric paging systems provided the capability of transmitting complete messages, such as "Call Joe at 305-123-7787" which was displayed on the receiver.

While prior paging systems have provided the paging user with the ability to select a message format suitable for his paging needs, the caller was not provided with a confirmation as to whether or not the page was received, especially when the paging user incurred considerable time to respond, as would often happen when the paging user was away from a telephone. One approach to solving the problem of confirming the paging user had received the message was to provide a real time voice talk back system. Such a system allowed the paging user to immediately respond with a voice message upon completion of receiving the message. The caller immediately knew the message was received, and if a response was not received, it was due either to the paging user being out of range, the pager being turned off, or the paging user being unable to immediately respond. In a system as described, once the paging user was able to talk back to the caller, the two were able to carry out a short two-way conversation. While both the paging user and the caller benefited from such real time talk back systems, it was generally at the expense of air time, the time to send the message, the time to deliver the response, and the time for any subsequent conversations. Since message throughput is a key factor in paging systems, such real time talk back systems were not widely promoted.

An alternative acknowledgment system, not requiring a voice response as in the talk back system, had been proposed which provided an acknowledge transmitter enabled by the paging user when a switch was actuated after receipt of the message. The transmitted acknowledge signal, when received at the paging terminal, initiated a canned voice response from the terminal to the caller indicating the message was received and understood. An immediate response to the message was necessary by the paging user if system throughput was to be maintained and only a limited number of canned responses were provided within the terminal.

Neither system described took into account the problems presented by dynamically varying system loading, and as a consequence, throughput was sacrificed for the capability to provide acknowledgment.

SUMMARY OF THE INVENTION

It is therefore an object of the present invention to provide an acknowledge back paging system that does not limit the response provided.

It is a further object of the present invention to provide an improved voice acknowledge back paging system.

It is a further object of the present invention to provide a voice acknowledge back paging system that does not limit message throughput.

According to the present invention, a paging system is provided that includes a page transmission means for transmitting selective call paging signals followed by voice messages, the messages originating from message origination devices, such as telephones. The page transmission means further includes circuitry for generating and transmitting query signals delayed at least a minimum predetermined time period from the corresponding selective call paging signals and voice messages. This time period may be extended during periods of high message traffic to transmit additional messages. Portable transceivers are provided for receiving the selective call paging signals and voice messages. The portable transceivers further have circuitry responsive to the query signals for enabling circuitry allowing the user to transmit a real time response signal, such as a voice acknowledgment, upon receipt of the query signal. A system receiver is provided for receiving the transmitted response signal for subsequent delivery of the response signal to the message origination device.

In a further embodiment of the present invention, the portable transceiver circuitry allows the user to generate the response signal immediately after the voice message has been received. The response signal generated is stored in a memory within the portable transceiver. When the query signal is received, the stored response signal is transmitted to a system receiver for delivery to the message origination device.

In a further embodiment of the present invention, the portable transceiver transmitter is activated when the query signal is received and a real time response signal is transmitted. The response signal is received by a system receiver and stored in a memory within the page transmission means. The response signal is then recovered from memory for delivery to the message origination device.

In still a further embodiment of the present invention, the portable transceiver circuitry allows the user to generate a response signal after the voice message is received. The response signal generated is then stored in a memory in the portable transceiver. When the query signal is received, the stored response signal is transmitted. A system receiver receives the transmitted response signal which is then stored in memory within the page transmission means. The response signal is then recovered from memory for delivery to the message origination device.

BRIEF DESCRIPTION OF THE DRAWINGS

The features of the invention which are believed to be novel are set forth with particularity in the appended claims. The invention itself, together with further objects and advantages thereof, may be best understood by reference to the following description when taken in conjunction with the accompanying drawings, in the several figures of which like reference numerals identify identical elements, in which:

FIG. 2 shows an example of a voice page transmitted using a Golay Sequential Code paging format.

FIGS. 3A-D show examples of four alternate methods of operation of the preferred embodiment of the present invention.

FIG. 4 shows a block diagram of a terminal for implementing the preferred embodiment of the present invention.

DESCRIPTION OF THE PREFERRED EMBODIMENT

Figure 1:
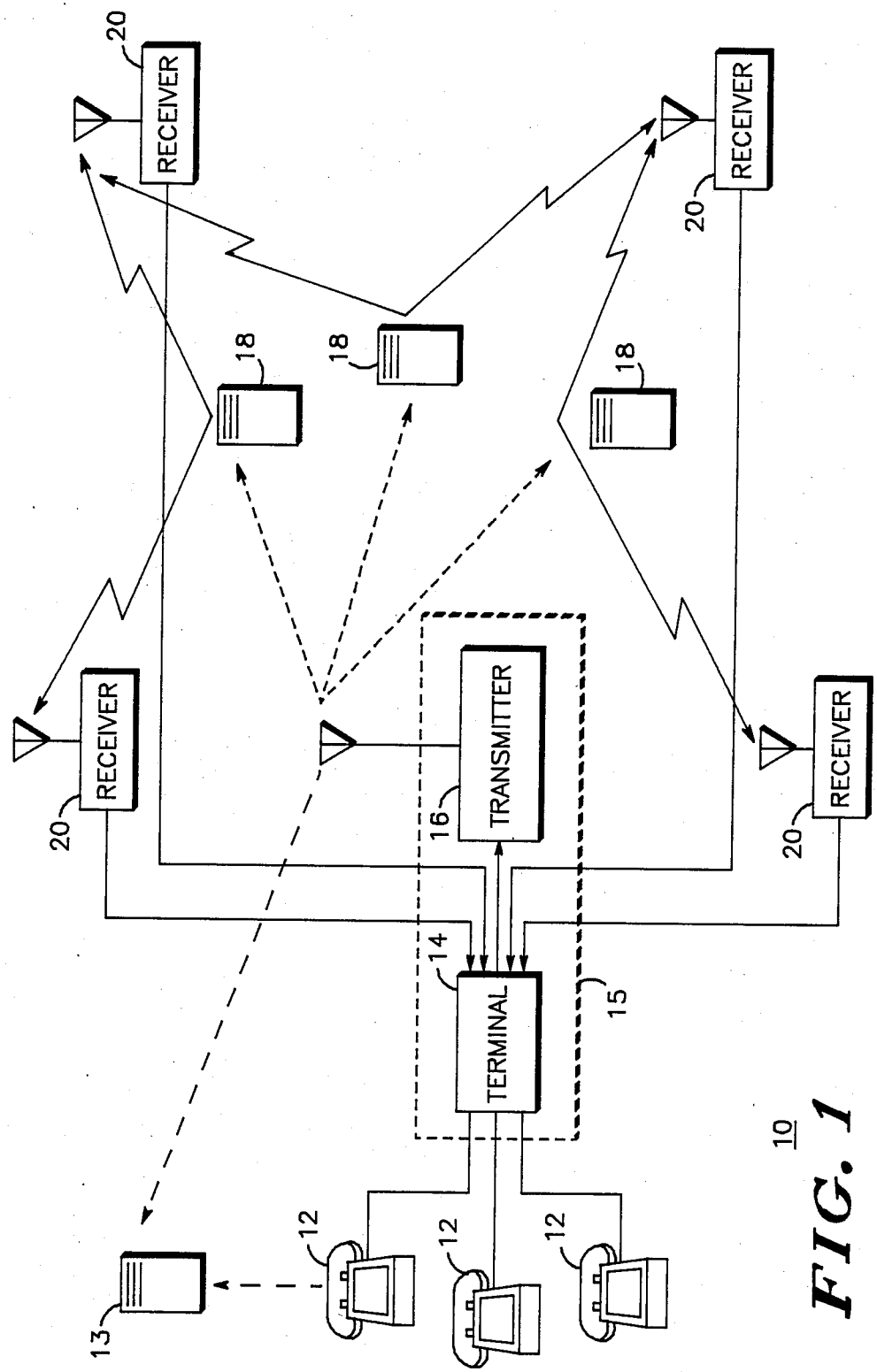
FIG. 1 shows a block diagram of the preferred embodiment of the present invention.

With respect to the figures in general, FIGS. 1 through 6 illustrate the preferred embodiment of the present invention, namely a speak back paging system. In particular, FIG. 1 illustrates a paging system 10 capable of transmitting selective call paging signals and messages. The messages originate from one or more message origination devices 12, such as telephones for voice or numeric messages, or data entry devices for alphanumeric messages. Messages are inputted into system 10 for transmission to one or more pagers 18 through a page transmission means 15 comprising paging terminal 14 and transmitter 16. Paging terminal 14 receives the incoming messages, either voice or data, and properly formats the messages with pager addresses or selective call paging signals corresponding to the pagers to be paged. The selective call paging signals and messages are generally placed in a queue prior to transmitting via transmitter 16. While only a single transmitter is shown in FIG. 1, it is well known in the art that paging system 10 may comprise multiple transmitters for transmitting the selective call paging signals and messages.

Unlike a conventional receive only pager, pager 18 is actually a portable transceiver having a transmitter for storing and/or transmitting a response message or signal after a message has been received. It will also be appreciated by one of ordinary skill in the art that, unlike a conventional transceiver, the portable transceiver transmitter is not directly activated by the paging user. The transmitter is only enabled after receiving a query signal, as will be described, generated a minimum predetermined time period after the corresponding paging signal and message are transmitted. This time period allows time for the paging user to determine a response prior to actually having to respond to the received message.

Figure 7:
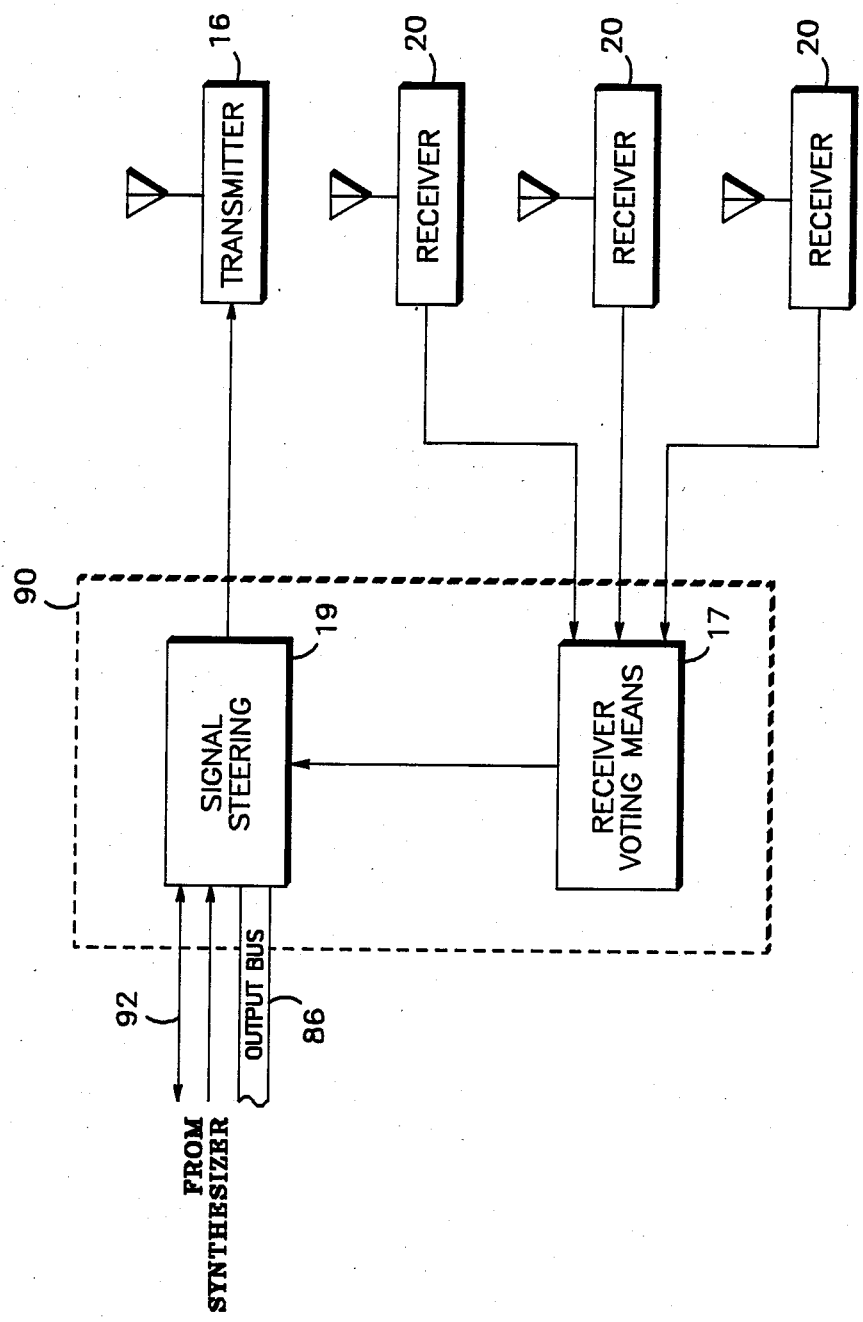
FIG. 7 shows a block diagram of the transmitter receiver control.

Paging system 10 includes one or more system receivers 20 for receiving the response signals generated from portable transceivers 18. The number of system receivers 20 utilized within the system are determined by a number of factors, some of which are: the power by which portable transceiver transmits the response signal; the format of the response signal, such as a voice or data response; and the general coverage area to be encompassed by the system. It will be appreciated by one of ordinary skill in the art that a plurality of transceivers may be used in place of individual transmitter 16 and system receivers 20, when a plurality of transmitter/receiver sites are provided in the system. When a plurality of receivers or transceivers are used within system 1, it will be appreciated that only the response signal from the receiver providing the highest response signal output level is selected by way of a receiver voting means 17 (shown in FIG. 7). One such system is disclosed in U.S. Pat. No. 4,013,962 entitled "Improved Receiver Selecting (Voting) System" to Beseke et al., assigned to the assignee of the present invention and which is incorporated herein by reference. The received response signal from the selected system receiver 20 is routed through terminal 14 for delivery to the corresponding message origination device 12 as will be described in detail later. Consequently, the system provides the receiver means whereby one or more receivers coupled with the receiver voting means allows receiving the transmitted response signal.

There may be instances when the caller leaves the message origination device 12 and is unable to receive the response signal generated. In this instance, if the caller has a pager 13, means are provided in terminal 14 to selectively enable the delivery of the response signal by the page transmission means 15 directly to pager 13 rather than to message origination device 12, as will be described in more detail later.

As will be appreciated by one of ordinary skill in the art, the coding format which is used in the preferred embodiment of the present invention is not limited to any particular coding format. For purposes of discussion, the Golay Sequential Code or GSC code developed by Motorola and shown in FIG. 2, is used to describe the operation of the present invention. The GSC code is especially suited for use in the paging system to be described, because voice, tone only and data paging capability is supported by the coding format. Further information on the GCS code may be found in "A Guide to the Golay Sequential Code", bulletin number R8-1-67A, published by Motorola, Inc. Attention is again directed to FIG. 2 which illustrates the format of the GSC code when used with voice messages for pagers having battery saver operation.

The GSC signal includes a preamble 30 of approximately 1.4 seconds duration, followed by a start code 32, pager address 34, and an activation code 36, each approximately 0.2 seconds in duration. Following receipt of activation code 36, the pager responds with a two second audible alert 38, alerting the paging user a voice message is to follow. A voice message 40 of approximately 10 seconds is then received, followed by a second activation code 42 which is transmitted to suspend further reception of other messages on the channel on which the portable transceiver is operating. The query signal may be transmitted in a fashion similar to that shown in FIG. 2, including the preamble, start code and query code unique to the portable transceiver previously paged, or if battery saving operation is suspended in the pager while the pager is awaiting receipt of the query signal, only the query code need be transmitted, thus saving a considerable amount of air time.

Specific application of the GSC code format in the preferred embodiment of the present invention is illustrated in FIGS. 3A-D. For simplification of the discussion, the message sequence described in FIG. 2 will hereinafter be referred to as voice page or message 50.

Reference is now directed to FIG. 3A illustrating the operation of one of the preferred embodiments of the present invention providing a speak back response to a transmitted message. When the message is a voice message, the paging user receives voice message 50 as previously described. A minimum predetermined time period 52 is established during which the paging user can determine a response for the message received. This time period is typically the time to transmit at least one additional voice message, or approximately 10 seconds. It will be appreciated that this time duration can be longer or shorter, depending upon the signalling format employed without departing from the spirit and scope of the present invention. Prior to generating query signal 58, the system contacts the caller 56. By allowing the system to allow the caller to hang up after the message was entered into the system, the incoming lines are freed up for additional messages from other callers to be entered into the system. After, a query signal 58 is generated and transmitted. Query signal 58 is unique to each portable transceiver 18 in the system. A unique alert tone is generated by portable transceiver 18 in response to decoding query signal 58, indicating to the paging user that the portable transceiver transmitter is being activated together with the means for generating and delivering a response to the received message. The paging user's voice response, or response signal 60, is transmitted by portable transceiver 18 and is received by one or more of the system receivers 20 located within the system, and the response signal 60 of the receiver providing the best audio quality signal is delivered via terminal 14 to the previously contacted caller waiting on the response.

In order to maintain system throughput as system loading increases, as is often encountered during the day, additional time interval 54 is provided. Time interval 54 allows one or more additional messages stored in queue to be transmitted before query signal 58 is transmitted, thereby improving system throughput.

In the system operation described in FIG. 3A, the response signal 60 is transmitted by portable transceiver 18 on the same frequency channel as that on which portable transceiver 18 receiver operates. The allowed response signal duration in the preferred embodiment of the present invention is therefore limited to a shorter time interval than provided for the caller's voice message, such as 5 seconds, so as to not substantially impact system throughput. It will be appreciated by one of ordinary skill in the art that separate transmit and receive frequency channels can also be employed without departing from the scope or spirit of the present invention. When separate transmit and receive frequency channel are used, the response signal duration can be at least as long as allocated to messages, or approximately 10 seconds, without degrading the number of pagers and portable transceivers that may receive an equivalent grade of service as a system operating without the speak back feature. This is especially desirable when a second frequency channel can be obtained for the system.

In the preferred embodiment of the present invention as illustrated in FIG. 3A, time interval 56 which is provided to allow the system to contact the caller prior to transmitting query signal 58, serves an additional function. Should the caller who originated the message be nonresponsive to this call to initiate delivery of the response signal by the system, transmission of the query signal 58 can be suspended for a period of time, such as required for the transmission of one or more additional messages, until the caller can be reached. When the caller is successfully contacted, query signal 58 is transmitted.

Figure 3B:
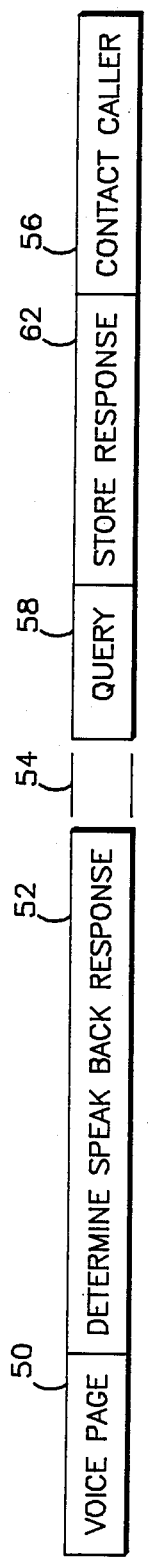

Reference is now directed to FIG. 3B, which describes a second embodiment of the operation of the present invention. In the second embodiment, portable transceiver 18 is paged and receives voice message 50. The paging user has time to consider his response during time interval 52 and additional time interval 54 as required by the system. Query signal 58, used to enable the portable transceiver transmitter, is then transmitted, allowing the response signal to be generated and transmitted. However, unlike the operation of the first embodiment of the present invention, response signal 62 is received, digitized and stored within a memory located in paging terminal 14. Paging terminal 14 then initiates contact with the caller 56, and when contact with the caller is made, the stored response signal 62 is delivered. By storing the response signal, the paging user is queried for his response at the earliest time after the original message has been transmitted without the need for having first contacted the caller to deliver the response signal.

Figure 3C:
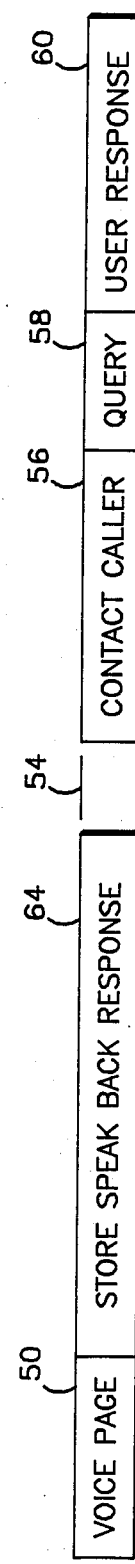

Reference is now directed to FIG. 3C which shows a third embodiment of the operation of the present invention. The paging user is paged and receives voice message 50. The paging user then has time to consider his response as previously described. However, in this operational embodiment of the present invention, the portable transceiver 18 provides the means to generate and store the response signal during time interval 64 which is immediately after the voice message has been received in a memory also included in the portable transceiver 18. One method of digitizing and storing voice messages in a paging receiver is described in U.S. patent application No. 07/68,682 to Bennett et al., entitled "Digitized Stored Voice Paging Receiver" and assigned to the assignee of the present invention which is hereby incorporated by reference. It will be appreciated by one of ordinary skill in the art that such a receiver can be utilized to directly digitize and store a voice message originated by the paging user with suitable circuits coupled to a microphone. The system automatically contacts the caller 56 prior to transmitting the query signal 58. After query signal 58 has been detected by the particular portable transceiver, the digitized stored response 60 is converted back to an analog signal and is transmitted by the portable transceiver transmitter without the need to alert the paging user. It will be appreciated by one of ordinary skill in the art that a unique alert signal may be generated after query signal 58 is detected to inform the paging user the stored response is being delivered.

Figure 3D:
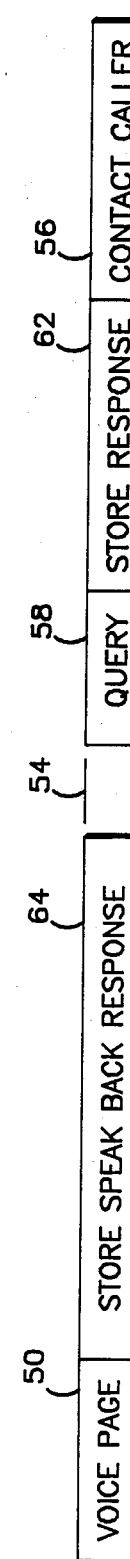

Reference is now directed to FIG. 3D which shows the fourth embodiment of the operation of the present invention. The paging user is paged and receives voice message 50. The paging user then has time to consider his response as previously described. The paging user again generates and stores the response signal during time interval 64 shortly after the voice message has been received. The digitized form of the response signal is stored in a memory within portable transceiver 18. Sometime thereafter, the system transmits query signal 58, enabling the portable transceiver transmitter to transmit the analog form of stored response signal 62. A unique alert signal may be generated after query signal 58 is detected to inform the paging user the stored response signal is being transmitted. The response signal received at terminal 14 is again digitized and stored 62 within a memory 42 located in paging terminal 14. Once the response signal has been stored, paging terminal 14 initiates contact with the caller 56, and when contact with the caller is made, the stored response signal is delivered.

In summary, four operational embodiments of the present invention are described. In all cases, after a message, such as a voice message, is received, a predetermined minimum time interval is generated before a query signal is generated. The transmitted query signal, when received by the portable transceiver, enables delivery of a user generated response signal, such as a voice message. In one embodiment, when the query signal is received, the paging user can immediately communicate a voice response to the caller who has been contacted to receive the response. In a second embodiment, the received response signal is stored in the terminal prior to contacting the caller to deliver the response. In a third embodiment, the response signal is stored within the portable transceiver and is recalled for transmission when the query signal is received. In a fourth embodiment, the response signal is stored in the portable transceiver prior to receipt of the query signal and then the received response signal is stored within the terminal. The caller is contacted to complete delivery of the response signal. While the response signal transmitted has been described as a voice message, it will be appreciated by one of ordinary skill in the art, that the response signal can also be a data message corresponding to any one of a number of canned responses stored within portable transceiver 18.

Reference is now directed to FIG. 4 which shows a block diagram of terminal 14 employed in the preferred embodiment of the present invention. In general, operation of paging terminals are well known to one of ordinary skill in the art, so only a brief description of the operation is being provided. One or more input ports 70 and 72 are connected to the telephone system enabling a message origination device, such as a telephone, access to paging terminal 14. When a call is received by paging terminal 14, an output is generated on digital input bus 74 which is coupled to controller 76. Controller 76, through digital input bus 74, enables supervisory tone generator 78 to generate an acknowledgment tone which is coupled to first input port 70. This tone is communicated to the caller through the telephone circuit and indicates the paging terminal is ready to accept the pager number of the portable transceiver to be paged. As is well known in the art, the number of digits to be entered for the pager number is dependent upon the number of pagers operational within the system, such as three digits for a 1000 pager system. The three digits, entered as DTMF tones from a touch-tone telephone, when received through first input port 70, are processed by a DTMF to binary converter to provide the digital data to be processed by controller 76. Controller 76 checks the received pager number with the subscriber list data base 80 to determine the actual pager address code to be transmitted to the selected portable transceiver. Subscriber list data base 80 is generally a nonvolatile memory such as a hard disk or EEPROM memory which may be periodically altered and updated as required for the number of subscribers on the system. Controller 76 through digital input bus 74 again enables supervisory tone generator 78 to generate a second acknowledgment tone indicating to the caller to enter the phone number from his touch-tone telephone where the system can reach the caller when delivery of the response signal is required. Alternately, the caller may enter his pager number by preceding the pager number by a control character, such as the asterisk or pound symbol from the telephone touch tone pad, in which case the received response signal would be delivered to the caller's pager rather than the telephone. Controller 76 then initiates the generation of a third acknowledgment tone indicating to the caller to speak the message, as in a voice system. It will be appreciated by one of ordinary skill in the art that voice leadthrough responses may be generated in lieu of acknowledgment tones directing the caller to enter the pager number, telephone number and message.

The caller's message may be initially stored by controller 76 directing the message through input audio port 84 to voice storage module 82 when other messages are currently being transmitted. Controller 76, through digital output bus 86, enables synthesizer 88 to generate the proper digital sequence corresponding to the selected portable transceiver to be paged. This digital sequence is outputted to transmitter/receiver control 90 to be sent to transmitter 16 for transmission. If the message is stored in voice storage module 82, controller 76 enables the message to be recovered through digital input bus 74. The message is routed through controller 76 to output audio bus 92 to transmitter/receiver control 90 to be sent to transmitter 16 for transmission. A paging signal corresponding to the digital address sequence and voice message is then transmitted by transmitter 16.

After an appropriate time as previously described, controller 76, through first input port 70, provides the means to contact the caller at the telephone number previously entered and determines the appropriate query code corresponding to the selected portable transceiver from subscriber list data base 80. If the caller cannot immediately be contacted, controller 76 will suspend the generation of the query signal. Controller 76 will then periodically attempt to contact the caller at predetermined time intervals, such as after one or more additional messages have been transmitted. When contact is achieved, controller 76 then enables synthesizer 88 to generate the query signal corresponding to the selected query code which is transmitted as previously described for the selective call paging signals.

A response signal transmitted from the portable transceiver is received by system receiver 20 and is coupled through transmitter/receiver control 90 to output audio bus 92 under control of controller 76. The response signal is next directed to input audio bus 84 for delivery to the caller through first input port 70, again under control of controller 76. When the response signal is to be stored within terminal 14, the received response signal is directed from output audio bus 92 by controller 76 to voice storage module 82 which provides a second memory means. Controller 76 then enables recovery of the stored response which is directed through input audio bus 84 through input 70 for delivery to the caller once the caller is contacted.

A further function of controller 76 is to monitor the number of messages being input into the system in a predetermined time period which are stored in voice storage module 82, thereby monitoring the relative message backlog which is indicative of system loading. When the number of stored messages exceeds a predetermined volume, controller 76 will temporarily suspend the transmission of the query signal, allowing additional stored messages to be transmitted. If message backlog has not been reduced before a predetermined period of time, such as the time to transmit five additional messages, controller 76 will cause the suspended query signal to be generated and transmitted, assuming the caller was contacted, and then return to reducing the message backlog. The duration of time during which the query signal is suspended can be greater or less, without affecting the function.

Figure 5:
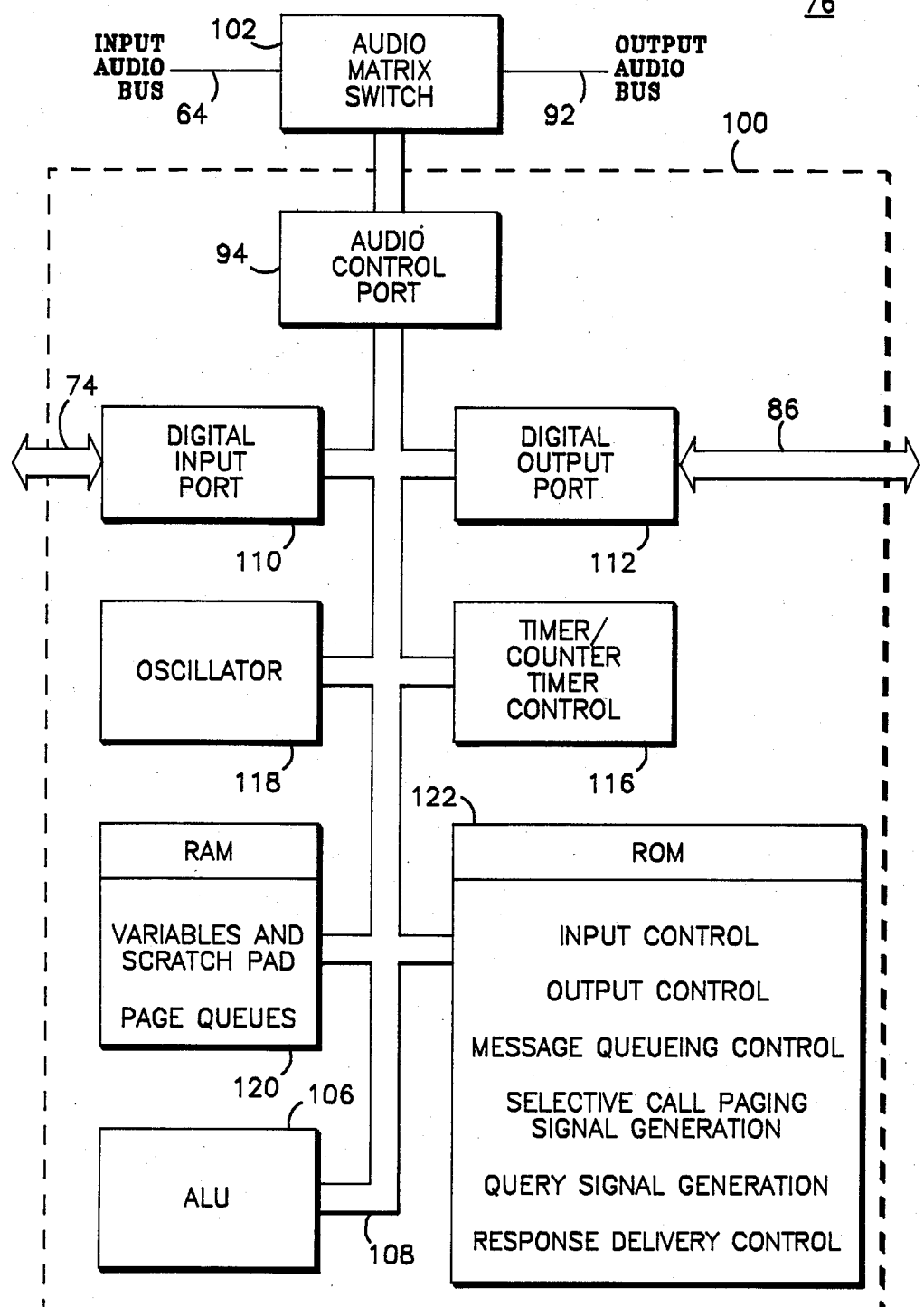
FIG. 5 shows a block diagram of the controller used to implement the preferred embodiment of the present invention.

Reference is now directed to FIG. 5 which shows a block diagram for controller 76. Controller 76 consists of microcomputer 100, such as an MC6809 manufactured by Motorola, for providing digital control through digital input bus 74 and digital output bus 86. Controller 76 also has control of input audio bus 64 and output audio bus 92 through audio matrix switch 102 through audio control port 94.

Microcomputer 100 includes ALU 106 for operational control. An internal bus 108 connects all the elements of microcomputer 100. Digital input port 110 couples to digital input bus 74, digital output port 112 couples to digital output bus 86, and digital audio control port 94 couples to audio matrix switch 102. Timer/counter 116 is used to generate time intervals required for system operation. Oscillator 118 provides the clock for operation of the CPU and the reference clock for counter/timer 116. RAM 120 is used by CPU 106 and also provides an area for paging queues and storage of telephone numbers at which the caller can be contacted. It will be appreciated by one of ordinary skill in the art that depending upon the size of the system, additional RAM or other memory means, such as a hard disk, may be required to provide adequate storage for the paging queues and telephone numbers. ROM 122 contains the firmware for controlling microcomputer 100 operation. Included within ROM 122 are routines providing for input control, output control, message queueing control, selective call paging signal generation, query signal generation and response delivery control and transceiver control, just to name a few.

Firmware control of terminal functions is well known in the art. One such example is the Modax 1000 paging terminal manufactured by Motorola.

Figure 6:
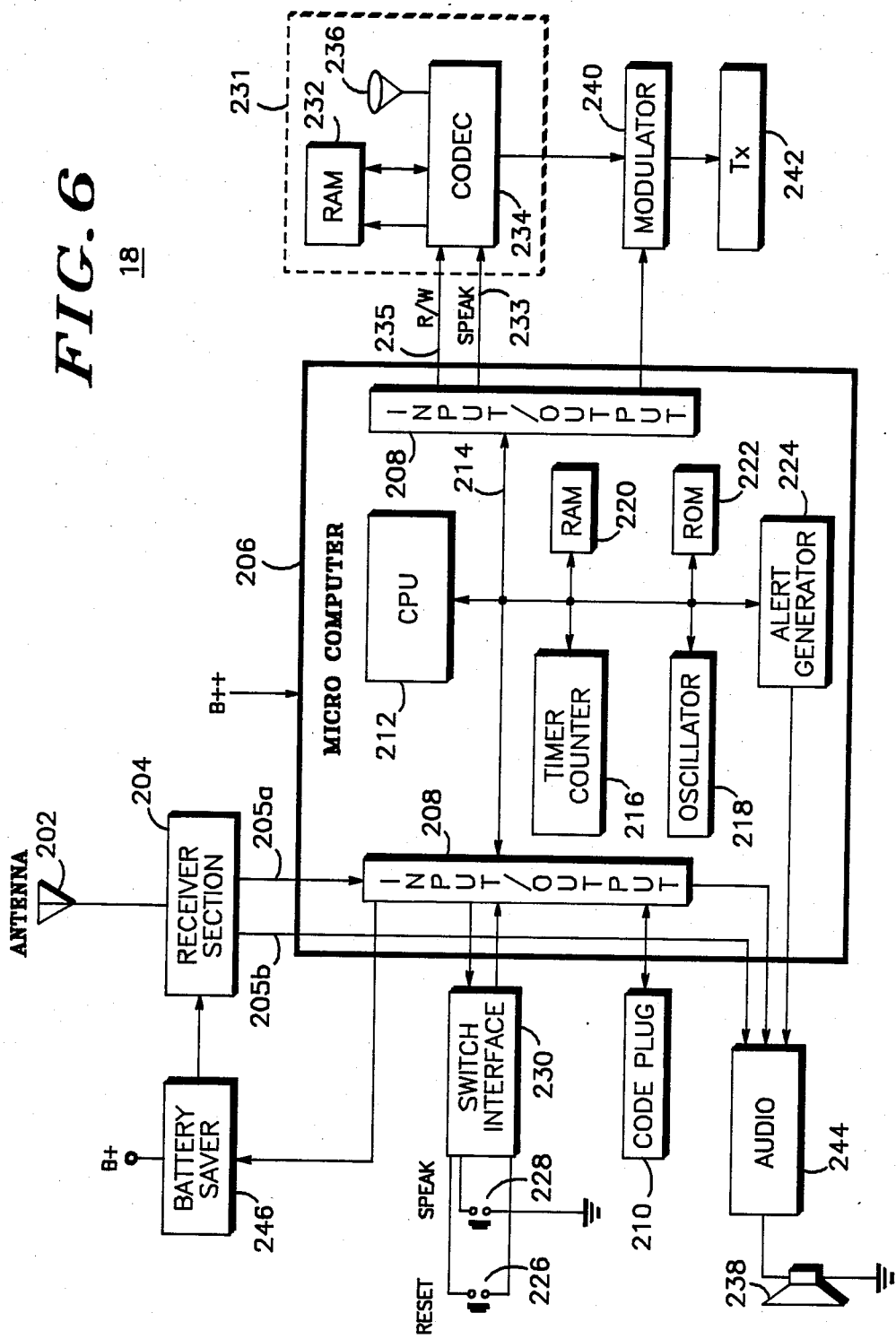
FIG. 6 shows a block diagram of a portable transceiver suitable for use in the preferred embodiment of the present invention.

Reference is now directed to FIG. 6 which shows the preferred embodiment for portable transceiver 18 utilizing a microcomputer in its implementation. The selective call paging signal and message transmitted by transmitter 16 are received by antenna 202. Receiver 204 detects the selective call paging signals and messages transmitted and provides two outputs 205a and 205b. A digital output 205a providing a recovered data stream corresponding to the pager address couples to microcomputer 206 through I/O port 208. An analog output 205b corresponding to the voice message couples to audio circuit 210.

Microcomputer 206 is a single chip microcomputer, such as the MC68HC05L6 manufactured by Motorola. As shown in FIG. 6, microcomputer 206 includes a CPU 212 for operational control. An internal bus 214 connects all the elements of microcomputer 206. I/O port 208 (shown split in the figure) provides communications to the circuits external to microcomputer 206. A timer counter 216 is used to generate timing intervals, such as required for battery saver operation and alert tone duration. Oscillator 218 provides the reference frequency for operation of CPU 212 and counter timer 216. RAM 220 is used as temporary storage of program variables. ROM 222 contains the firmware controlling microprocessor 206 operation. Programs, such as for decoding the pager address and query signals, battery saver operation, and response signal transmission, are stored in ROM 222. An alert generator 224 provides the alerting signal in response to decoding the address information.

As shown in FIG. 6, two switches are provided for control of portable transceiver 18 functions, a RESET switch 226 and a SPEAK switch 228. Other switches may be employed to control other portable transceiver functions without departing from the scope or spirit of the present invention. A switch interface 230 provides the electronics necessary to couple the switches to I/O port 208. RESET switch 226 allows manual resetting of the audio circuit after a message has been received. RESET switch 226 can also be used to monitor the communications channel on which the portable transceiver is operating.

SPEAK switch 228 is not required on a portable transceiver that does not include a memory means 231 consisting of a memory 232 and a device for digitizing and recovering a voice response, such as codec 234, as previously described, when the response signal is immediately generated and transmitted upon receipt of the query signal. When the portable transceiver includes memory means 231, SPEAK switch 228, when actuated after a message has been received and after the audio has been reset, generates a speak enable signal 233 at I/O port 208. The audio can be reset either manually with the RESET switch or automatically upon detection of the second transmitted activation code.

The speak enable signal enables codec 234 to begin digitizing the voice response generated by the paging user with microphone 236. Microcomputer 206 has at this time also set the Read/Write (R/W) line in the write mode enabling the storage of the digitized voice response into a first memory means, such as memory 232. It will be appreciated by one of ordinary skill in the art, that most forms of digitization require a substantial amount of memory. By selectively enabling codec 234 via speak enable switch 233, the voice response is digitized and stored only when the user decides to save the response. This gives the user additional time to consider his response prior to actually storing it within the portable transceiver.

Code plug 210 stores the predetermined address information, for one or more addresses, to which the portable transceiver will respond, as well as the predetermined query signal to which the portable transceiver will respond providing the means for enabling the generation and transmission of the user response signal. Operation of microcomputer 206 as an address decoder is well known in the art. Once microcomputer 206 has detected one of the predetermined addresses to which it may respond, a two second alert signal is generated by alert generator 224, the output of which is coupled to audio circuit 244 for delivery by speaker 238. Upon completion of the alert signal, microcomputer 206 generates an output at I/O port 208 which couples to audio circuit 244, enabling audio circuit 244 to deliver the voice message received after the address to speaker 238. Upon completion of the voice message, microcomputer 206 monitors the digital output 205a for the query signal generated at the minimum predetermined time or thereafter, depending upon system loading. Upon decoding the query signal, microcomputer places R/W output 235 in the read mode and simultaneously enables modulator 240 and transmitter 242 to transmit the stored response signal. Modulators and transmitters suitable for transmitting the response signal are well known in the art.

Battery saver circuit 246 controls power to the receiver section in a manner well known to one of ordinary skill in the art extending portable transceiver 18 battery life. Once portable transceiver 18 has received and decoded the address signal, power is continuously supplied to the receiver section to receive the voice message, after which portable transceiver 18 may return to the battery saver mode or power may remain continuously supplied to the receiver until the query signal is received. If the battery saver mode is selected, the channel is continuously sampled until the query signal to which portable transceiver 1 will respond is detected. In either case, when the query signal is detected, modulator 240 and transmitter 242 are enabled to either transmit the users response signal directly, or to transmit the stored response signal as previously described. The portable transceiver transmitter is powered only long enough to transmit the response signal, thereby controlling power consumption. The portable transceiver transmitter is further controlled by limiting the transmit power to a level, such as 200 mw, which is suitable for a small on-site paging system with a number of receivers having high gain antennas strategically located around the coverage the area.

To recap, a portable transceiver is described which responds not only to a typical selective call paging signal followed by a message, but the same decoder also responds to a query signal generated a minimum predetermined period of time after transmission of the message.

While the basic description of the preferred embodiment of the present invention has been limited to a system utilizing the GSC coding format, it will be appreciated by one of ordinary skill in the art that other coding formats, such as POCSAG or two or five tone paging formats could e used equally as well. It will further be appreciated by one of ordinary skill in the art, that while only a voice message format was described herein, any appropriate messaging format, such as tone only, numeric or alphanumeric, can be used equally as well without departing from the scope or spirit of the present invention. It will further be appreciated, that when any coding format is provided which provides a message duration which requires the transmission time to be much shorter than the time to respond to the message transmitted, such as a tone only or data message format, the minimum predetermined period of time to the transmission of the query signal may be substantially greater then the time to transmit the message. The use of the query signal allows recovery of a speak back acknowledgment, as described, while maximizing system throughput. It will be further appreciated, that while the description of the present invention has been limited to that of a speak back response, the use of "canned messages" or other forms of prestored responses selectable by the paging user are equally suitable for use with the present invention. Finally, while the discussion has been limited to a system incorporating only transceivers for use in a speak back type system, it will be appreciated the system described may incorporate a mix of conventional pagers and speak back transceivers without departing from the spirit or scope of the present invention.

I claim:

1. A paging system comprising:
   page transmission means, responsive to a message origination device, for transmitting selective call paging signals and messages;
   means for generating query signals delayed at least a minimum predetermined time period from the corresponding paging signals, said generating means coupled to said page transmission means for transmitting said query signals;
   a plurality of portable selective call transceivers responsive to the selective call paging signals for receiving the messages;
   said portable transceivers further having means for enabling the generating and transmitting of response signals in response to said transmitted query signals being received;
   receiver means capable of receiving said transmitted response signals from said portable transceivers; and
   means, responsive to said receiver means, for contacting said message origination device to deliver said received response signals.

2. The paging system according to claim 1 wherein said page transmission means comprises:
   a terminal, responsive to the message origination device for formatting the selective call paging signals and messages, said terminal further being responsive to said receiver means for contacting said message origination device to deliver said received response signals; and
   a transmitter for transmitting the selective call paging signals and messages to the portable transceivers.

3. The paging system according to claim 2 wherein said transmitter transmits the selective call paging signals and messages on a first frequency channel and said portable transceiver transmits said query signal on a second frequency channel.

4. The paging system according to claim 2 wherein said transmitter transmits the selective call paging signals and messages on a first frequency channel and said portable transceiver transmits said query signal on the same first frequency channel.

5. The paging system according to claim 1 wherein said portable transceiver further comprises:
   means responsive to the selective call paging signals for enabling the generating of response signals; and
   first memory means for storing said response signals.

6. The paging system according to claim 5 wherein said memory means comprises:
   a device for digitizing said generated response signal, said device further recovering said response signal in response to said query signal being received; and
   a memory for storing said digitized response signal.

7. The paging system according to claim 2 further comprising second memory means, operatively coupled to said receiver means, said memory means for storing said response signals received from said portable transceiver, said memory means further coupled to said terminal for delivering said stored response signal to the message origination device when the device is contacted.

8. The paging system according to claim 1 wherein said receiver means comprises:
   one or more receivers for receiving the transmitted response signals; and
   receiver voting means coupled to said receivers and to said terminal means for selecting the one receiver having the highest response signal output level.

9. The paging system according to claim 1 wherein the message transmitted is a voice message.

10. The paging system according to claim 1 wherein the message transmitted is a data message.

11. The paging system according to claim 1 wherein the response signal is a voice message.

12. The paging system according to claim 1 wherein the response signal is a data message.

13. The paging system according to claim 2 wherein said terminal means further includes means for selectively enabling the delivery of said response signal by said page transmission means.

14. A method for delivering a response signal to a message origination device, the response signal being transmitted by a portable transceiver after receiving a transmitted selective call paging signal and a message from a page transmission means, said method comprising the steps of:

contacting the message origination device;

generating and transmitting a query signal by the page transmission means, the query signal transmission delayed at least a minimum predetermined time period from the transmission of the selective call paging signal and message;

receiving the transmitted query signal by the portable transceiver for effecting the generating and transmitting of the response signal; and receiving the response signal transmitted from the portable transceiver by a separate receiver operatively coupled to the page transmission means for effecting the delivery of the response signal to the message origination device.

15. The method according to claim 14 further comprising the steps of:

receiving the response signal transmitted from the portable transceiver;

storing the response signal in a first memory means;

contacting the message origination device; and recovering the stored response signal from the first memory means for delivery to the message origination device.

16. The method according to claim 14 further comprising the steps of:

generating and storing the response signal in the portable transceiver after receiving the message; and recovering and transmitting the stored response signal in response to receiving the query signal.

17. The method according to claim 14 further comprising the steps of:

monitoring the number of selective call paging signals and messages being input from message origination devices for transmission in a predetermined time period;

suspending the generating of the query signal when the number exceeds a predetermined value;

monitoring the number for a predetermined time period; and generating and transmitting the query signal when the number is reduced or after the predetermined time interval.

18. The method according to claim 15 further comprising the steps of:

suspending the transmitting of the query signal upon failing to contact the message origination;

waiting a predetermined time period before attempting to recontact the message origination device; and generating and transmitting the query signal after contacting the message origination device.

19. The method according to claim 18 further comprising the step of transmitting the received response signal by the page transmission means when selected by the message origination device.

* * * * *